United States Patent
Wang et al.

(10) Patent No.: US 10,823,618 B2
(45) Date of Patent: Nov. 3, 2020

(54) METHODS AND SYSTEMS FOR TEMPERATURE MEASUREMENT WITH MACHINE LEARNING ALGORITHM

(71) Applicant: General Electric Company, Schenectady, NY (US)

(72) Inventors: Guanghua Wang, Clifton Park, NY (US); Bernard Bewlay, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 283 days.

(21) Appl. No.: 15/879,878

(22) Filed: Jan. 25, 2018

(65) Prior Publication Data

US 2019/0226913 A1 Jul. 25, 2019

(51) Int. Cl.
| | |
|---|---|
| *G06K 9/20* | (2006.01) |
| *G01J 5/00* | (2006.01) |
| *G01J 5/10* | (2006.01) |
| *G06K 9/66* | (2006.01) |
| *G06K 9/00* | (2006.01) |
| *G01J 5/60* | (2006.01) |

(52) U.S. Cl.
CPC ............... *G01J 5/0003* (2013.01); *G01J 5/10* (2013.01); *G01J 5/605* (2013.01); *G06K 9/00624* (2013.01); *G06K 9/2018* (2013.01); *G06K 9/2054* (2013.01); *G06K 9/66* (2013.01); *G01J 2005/0074* (2013.01); *G01J 2005/0077* (2013.01); *G01J 2005/0085* (2013.01); *G01J 2005/607* (2013.01)

(58) Field of Classification Search
CPC .. G01J 5/0003; G01J 5/605; G01J 5/10; G01J 2005/0074; G01J 2005/607; G01J 2005/0077; G01J 2005/0085; G06K 9/00624; G06K 9/2018; G06K 9/66; G06K 9/2054
See application file for complete search history.

(56) References Cited

U.S. PATENT DOCUMENTS

| | | | | |
|---|---|---|---|---|
| 5,304,809 | A * | 4/1994 | Wickersheim | G01N 21/6408 250/458.1 |
| 5,963,311 | A * | 10/1999 | Craig | G01J 5/602 356/43 |
| 6,016,190 | A * | 1/2000 | Glazman | G01J 5/602 356/43 |

(Continued)

OTHER PUBLICATIONS

Zhao, Weili et al., "Diagnosis of Aircraft Engine Performance Deterioration Based on Support Vector Machines", 2014 10th International Conference on Reliability, Maintainability and Safety (ICRMS), Guangzhou, Aug. 6-8, 2014, (pp. 44-48, 5 total pages).

(Continued)

*Primary Examiner* — Yon J Couso
(74) *Attorney, Agent, or Firm* — Buckley, Maschoff & Talwalkar LLC

(57) ABSTRACT

A method includes capturing an image, and performing region detection on the captured image. The region detection includes identifying an object represented in the captured image. The method further includes detecting emissivity of the identified object and determining the temperature of the object based on the detected emissivity of the object.

22 Claims, 4 Drawing Sheets

(56) References Cited

U.S. PATENT DOCUMENTS

| | | | |
|---|---|---|---|
| 7,961,906 B2* | 6/2011 | Ruedin | G06K 9/6289 |
| | | | 382/103 |
| 8,244,025 B2 | 8/2012 | Davis et al. | |
| 8,528,317 B2 | 9/2013 | Gerez et al. | |
| 9,305,345 B2 | 4/2016 | Lim et al. | |
| 9,459,153 B2 | 10/2016 | Patrick et al. | |
| 9,796,479 B2 | 10/2017 | Tucker et al. | |
| 2007/0290131 A1* | 12/2007 | Antel | G01J 5/0022 |
| | | | 250/338.1 |
| 2017/0091791 A1 | 3/2017 | Srinivasan et al. | |
| 2017/0195561 A1 | 7/2017 | Hegelich et al. | |
| 2018/0150694 A1* | 5/2018 | Guttmann | G06K 9/00718 |
| 2018/0345485 A1* | 12/2018 | Sinnet | G06T 7/73 |
| 2019/0134754 A1* | 5/2019 | Jacquemetton | G01N 21/8806 |
| 2019/0212261 A1* | 7/2019 | Lannestedt | G01J 3/0208 |

OTHER PUBLICATIONS

Yang, Chunsheng et al., "Developing machine learning-based models to estimate time to failure for PHM", 2016 IEEE International Conference on Prognostics and Health Management (ICPHM), Ottawa, Jun. 20-22, 2016, (pp. 1-6, 6 total pages).

Tuama, Amel et al., "Camera Model Identification With the Use of Deep Convolutional Neural Networks", 2016 IEEE International Workshop on Information Forensics and Security (WIFS), Abu Dhabi, Dec. 4-7, 2016, (pp. 1-6, 6 total pages).

* cited by examiner

METHODS AND SYSTEMS FOR TEMPERATURE MEASUREMENT WITH MACHINE LEARNING ALGORITHM

BACKGROUND

Technical Field

Embodiments of the invention relate to detection of temperatures of objects based on processing of images of the objects.

Discussion of Art

According to conventional techniques, the temperature of an object may be measured, if the emissivity of the object has been established, by analysis of image data that represents the object and that is currently obtained via a digital camera. As is known, the emissivity of a surface of an object corresponds to the effectiveness of the surface in emitting energy as thermal radiation.

However, when there are a number of different objects represented in an image, currently practiced techniques may fail to provide accurate temperature measurements for the objects due to differences in emissivity that may exist among the various objects in the image.

BRIEF DESCRIPTION

In some embodiments, an apparatus includes a digital camera and a processor coupled to the digital camera to receive image data from the digital camera. The apparatus further includes a memory in communication with the processor. The memory stores program instructions, and the processor is operative with the program instructions to perform region detection on an image represented by the image data. The region detection includes identifying an object represented in the image. The processor is further operative to detect emissivity of the object and to determine a temperature of the object based on the detected emissivity of the object.

DESCRIPTION

Some embodiments of the invention relate to pyrometry, and in particular to a pyrometric apparatus that employs machine learning to identify objects represented within an image captured by a digital camera. For an object that is identified in this way, reference is made to a database that indicates the emissivity of many objects. By the reference to the database, the emissivity of the identified object is looked up. With the object's emissivity now known, pyrometric techniques are employed to determine the temperature of the object.

Figure 1:
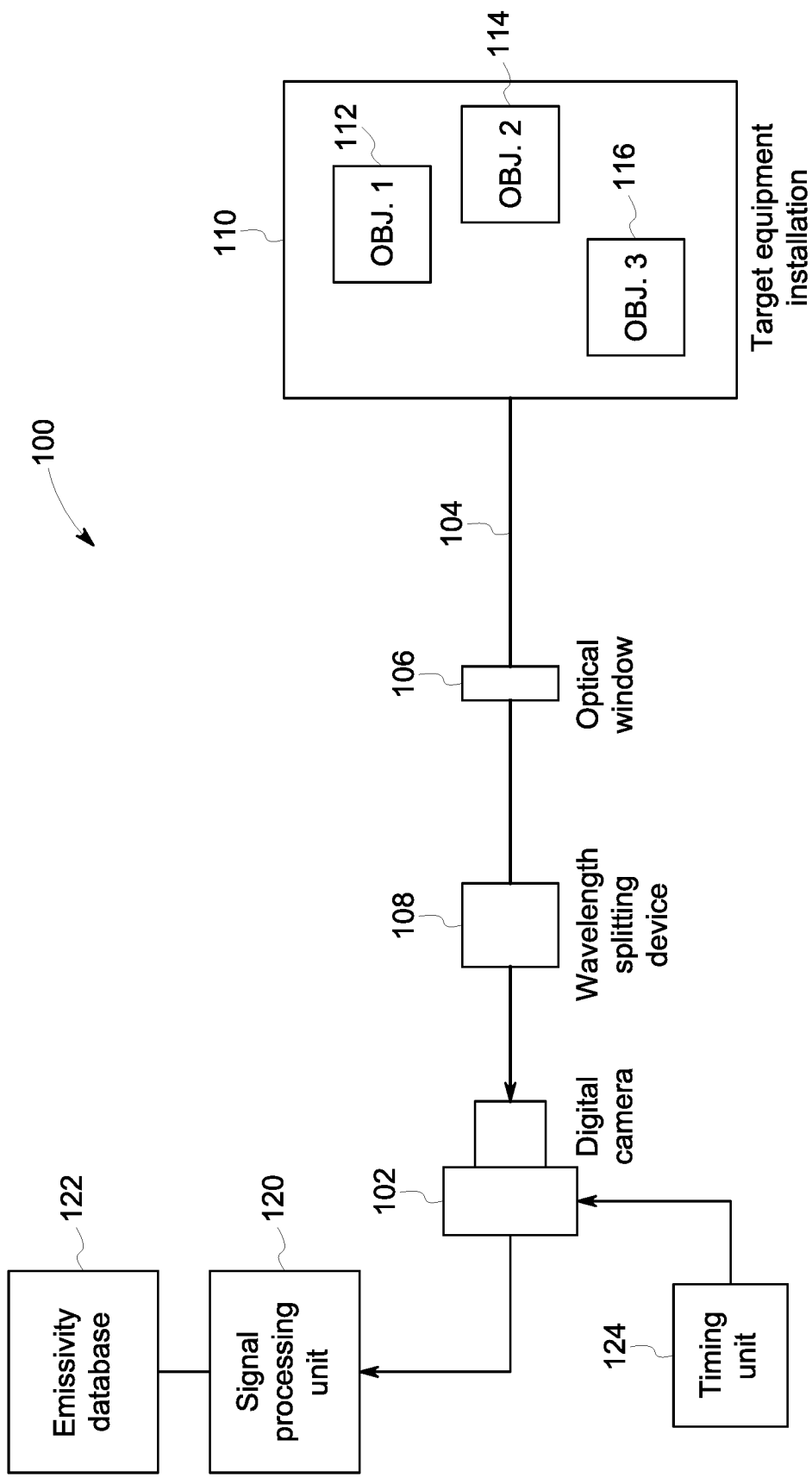
FIG. 1 is a block diagram of an optical temperature-measurement system.

FIG. 1 is a block diagram of an optical temperature-measurement system 100. As seen in FIG. 1, the optical temperature-measurement system 100 includes a digital camera 102. Via an optical axis 104 that passes through an optical window 106 and a wavelength splitting device 108, the optical temperature-measurement system 100 captures an image of a target equipment installation, schematically shown at 110. The target equipment installation 110 includes a number of different objects, including for example one or more pipes, valves, casings, a cowl, etc. The objects within the target equipment installation 110 are schematically represented at 112, 114, 116.

The optical temperature-measurement system 100 further includes a signal processing unit 120 that is operatively coupled to the digital camera 102 to receive image data generated by the digital camera 102. It will be appreciated that the image data received by the signal processing unit 120 from the digital camera 102 may represent one or more images of the target equipment installation 110 and thus may represent the objects 112, 114, 116.

The optical temperature-measurement system 100 further includes an emissivity database 122. The emissivity database 122 is operatively coupled to the signal processing unit 120 to permit the signal processing unit 120 to retrieve emissivity data stored in the emissivity database 122.

For some applications, the optical temperature-measurement system 100 may also include a timing unit 124. The timing unit 124 may be coupled to the digital camera 102 to control the timing at which the digital camera 102 captures images of the target equipment installation 110.

The digital camera 102 may be an infrared camera, a near-infrared camera, a long-wavelength infrared camera and/or an extended infrared camera.

The wavelength splitting device 108 may be or include an optical filter, a mosaic filter array, a spectrometer, dichroic mirrors, a rotating filter such as a color wheel, etc. In some embodiments, the wavelength splitting device 108 may be physically integrated with the digital camera 102.

In some embodiments, the signal processing unit 120 may be implemented—in its hardware aspects—with conventional computer or data processing equipment or components, such as the computer configuration shown in FIG. 4 and described below. In some embodiments, the emissivity database 122 may be hosted in hardware that is integrated with the signal processing unit 120. As described below, image analysis, machine learning/object recognition and pyrometry algorithms may be run on the signal processing unit 120.

The emissivity data stored in the emissivity database 122 may be obtained from commercially available sources of such data and/or may be derived by measurements taken to establish the emissivity of various objects.

The timing unit 124, if present, may for example serve the function of synchronizing capture of images by the digital camera 102 with rotation or oscillation of a rotating or oscillating object of interest.

The target equipment installation 110 may be, for example, an item of power generation equipment, or a jet engine, to list two of many possible examples.

Figure 2:
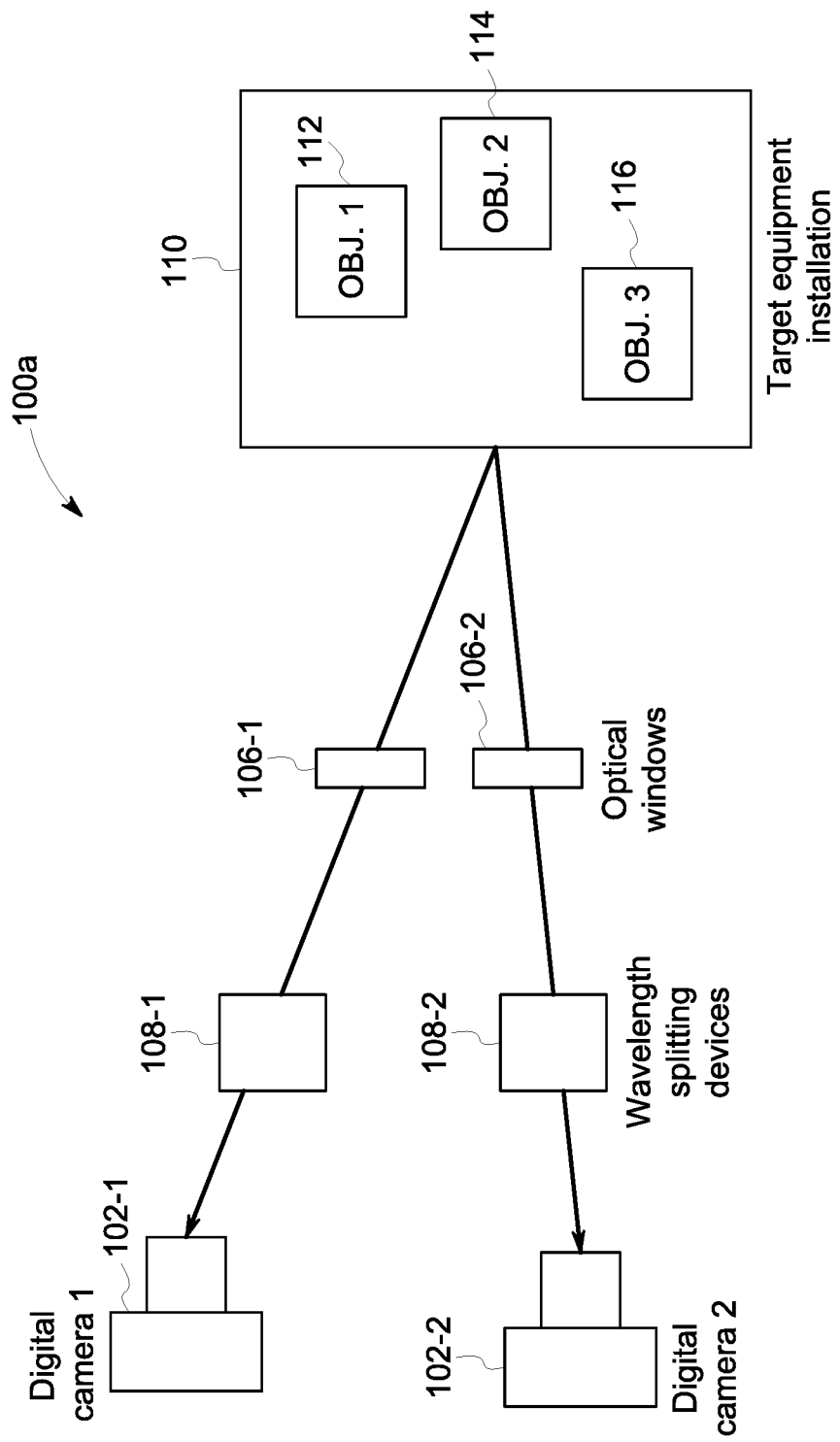
FIG. 2 is a block diagram that illustrates an alternative embodiment of the optical temperature-measurement system.

FIG. 2 is a block diagram that illustrates an alternative embodiment (reference numeral 100a) of the optical temperature-measurement system. A main difference between the optical temperature-measurement system 100a of FIG. 2 and the optical temperature-measurement system 100 is that the former employs two digital cameras (indicated at 102-1 and 102-2 in FIG. 2) rather than one. A wavelength splitting device 108-1 is associated with the digital camera 102-1 shown in FIG. 2, and a wavelength splitting device 108-2 is associated with the digital camera 102-2 shown in FIG. 2. An optical window 106-1 is associated with the digital camera 102-1, and an optical window 106-2 is associated with the digital camera 102-2. Both of the digital cameras 102-1 and 102-2 are oriented to capture images of the target equipment installation 110 and its associated objects 112, 114, 116.

Although not shown in FIG. 2 in order to simplify presentation of the drawing, the optical temperature-measurement system 100a should also be understood to include a signal processing unit coupled to both digital cameras 102-1, 102-2. Also not shown but also present is the above-mentioned emissivity database coupled to the signal processing unit. Still further, a timing unit may be present and may be coupled to both digital cameras.

In some examples of the optical temperature-measurement system 100a, the two digital cameras may have overlapping wavelength ranges. In some examples, one may be a visible light color (RGB) camera and the other may be an infrared camera.

Figure 3:
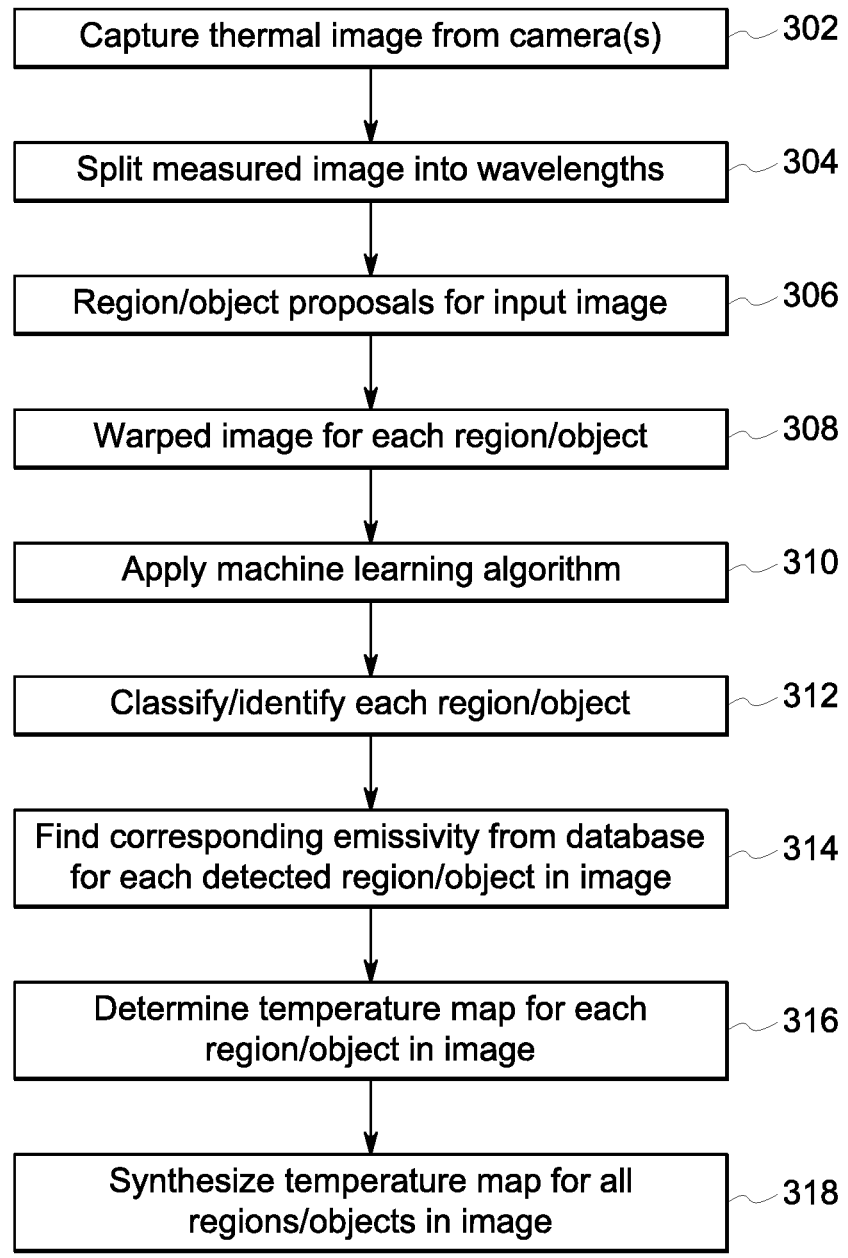
FIG. 3 is a flow diagram of an operation according to some embodiments.

FIG. 3 is a flow diagram of an operation according to some embodiments.

At 302, a thermal image of the target equipment installation 110 is captured by the digital camera 102 (or by cameras 102-1 and 102-2, as the case may be). If there are two cameras in the optical temperature-measurement system, then a composite image of the target equipment installation 110 may be formed from the respective images provided by the two cameras. The image or images in question may be split into wavelengths/wavelength ranges, as indicated at 304 in FIG. 3.

At 306, a machine learning algorithm (which may have been previously trained) and multicolor information may be employed by the signal processing unit 120 to provide region/object proposals for the image as supplied to the signal processing unit 120 from the digital camera(s) in the form of image data. In some embodiments, a technique such as R-CNN (region proposal with a convolutional neural network) may be employed by the signal processing unit 120. The signal processing unit 120 may be programmed accordingly. Following the region/object proposals, the signal processing unit 120 may form a warped image for each region or object, as indicated at 308 in FIG. 3. The machine learning algorithm may then be applied (block 310, FIG. 3), leading to classification and/or identification (block 312) of each object proposed at 306.

Further information will now be provided regarding the machine learning algorithm(s) employed at blocks 306, 308, 310 and 312 shown in FIG. 3. In general, functions performed by the machine learning algorithm(s) are object detection and object classification. The functions of blocks 306, 308, 310 and 312 may be applied in a single integrated algorithm or in two or more separate algorithms. The machine learning algorithm or algorithms may each have two modes—training and inference. In the training mode, the algorithm(s) may be trained from scratch or optimized from existing trained models in similar applications with collected training data. In the inference mode, the trained model is applied to newly available data (image data) to perform object detection and object classification.

In some example embodiments, the machine learning algorithm(s) may use R-CNN, Fast R-CNN and/or Faster R-CNN for object detection and object classification. In still other embodiments, any machine learning algorithm that can perform object detection and/or object classification can be used alone or in combination to perform the functions of blocks 306, 308, 310 and 312.

Continuing to refer to FIG. 3, at block 314, the signal processing unit 120 may access the emissivity database 122 to retrieve stored emissivity data that corresponds to the one of the objects identified at block 312. The emissivity data that corresponds to the identified object may indicate the emissivity of the identified object. By retrieving the emissivity data for the object from the emissivity database 122, the signal processing unit 120 may be said to have detected the emissivity of the object.

With the emissivity of the object now available to the signal processing unit 120 via access to the emissivity database 122, the signal processing unit may now engage in a pyrometric process based on image data from the digital camera(s) and based on the emissivity for the object to determine a temperature map for the object (block 316). This may involve determining at least one temperature of the object. The processing of blocks 314 and 316 may be performed by the signal processing unit 120 with respect to each object/region identified at block 312. Consequently, the signal processing unit may determine a temperature map for each object (in this example, for each of objects 112, 114, 116). In some cases, the temperatures of the three objects 112, 114, 116, as determined by the signal processing unit 120, may all be different from each other.

From the object temperature maps determined at 316, the signal processing unit 120 may synthesize (block 318) a temperature map for all regions/objects in the image captured by the digital camera(s). This temperature map may be used for monitoring of the target equipment installation 110. For example, the temperature map may be provided as an input to a monitoring function (not shown), which may determine on an ongoing basis whether the target equipment installation is operating normally. It will be appreciated that the signal processing unit 120 may receive image data from the digital camera(s) at regular intervals and may perform the above described image processing and pyrometry at those intervals so as to regularly provide updated temperature maps to the monitoring function.

With an optical temperature-measurement system as described herein, it may be practical to provide accurate temperature distribution measurement with respect to objects within a single image notwithstanding that the objects have different emissivities. Since, via object identification and retrieval of pertinent emissivity data, the correct emissivity for an object may be known to the signal processing unit 120, the accuracy of temperature measurement with respect to each object may be improved. This benefit is facilitated by automatic object detection and classification. In some applications, two or more objects having the same emissivity may be identified. For example, in some applications, two or more human beings may be identified as objects in the image.

A further advantage of the optical temperature-measurement system described herein is that the signal processing unit 120 simultaneously identifies and measures the temperatures of a number of different objects in the same image. With object detection and temperature monitoring it may be possible both to reduce false alert rates and to reduce failures to detect alert conditions. Alert conditions such as leaks may be detected reliably by using techniques disclosed herein. The optical temperature-measurement system described herein may also facilitate online monitoring of an installed asset that has complex parts.

In addition to monitoring of installed assets, the image processing/pyrometry processing described herein may also be applicable to fields such as self-driving vehicles and target acquisition.

In connection with blocks 306-312 as discussed above, other types of machine learning for object classification may be employed in addition to or instead of R-CNN. For example, so-called "Fast R-CNN" or "Faster R-CNN" may be employed.

Figure 4:
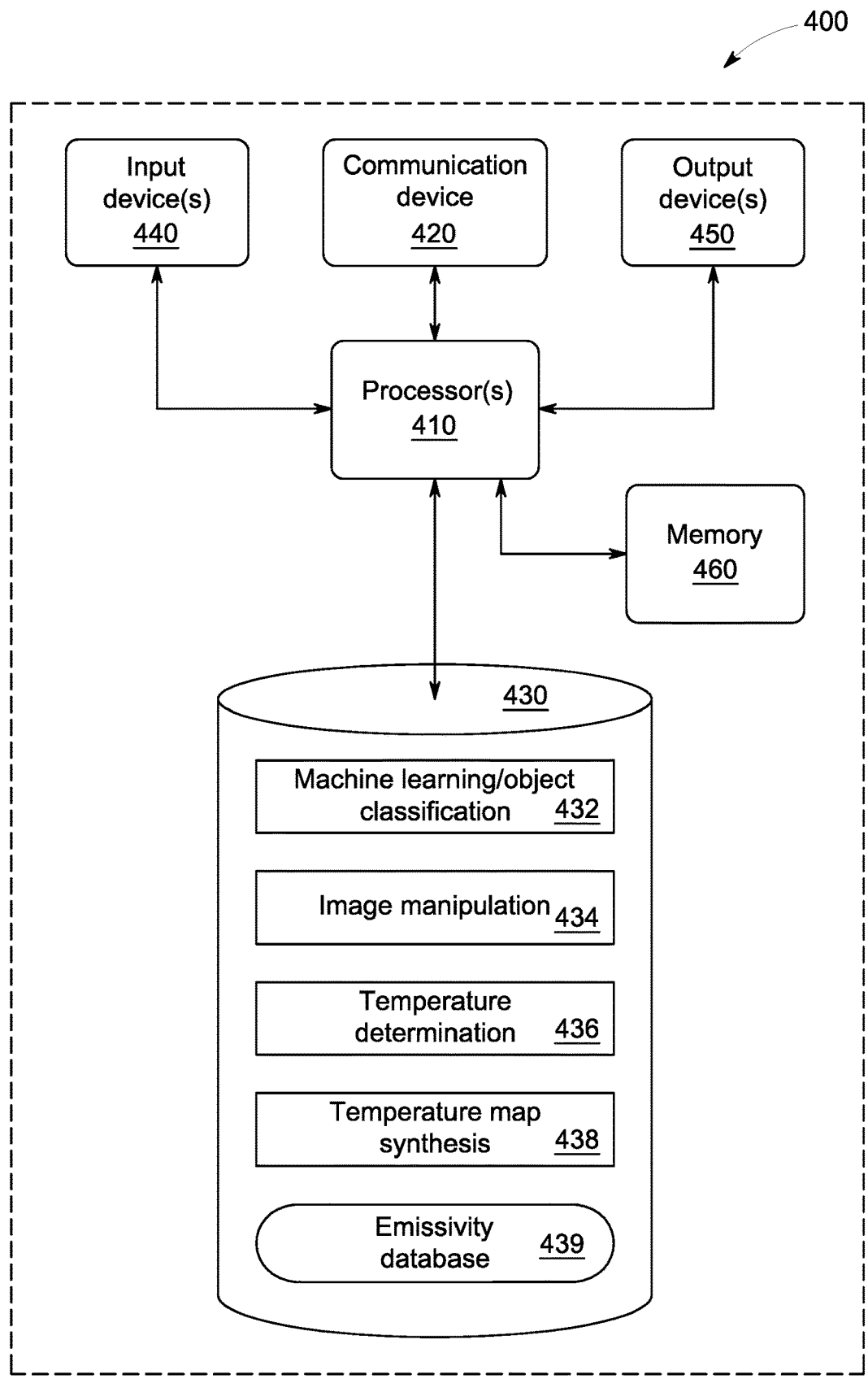
FIG. 4 is a block diagram of a computing system according to some embodiments.

System 400 shown in FIG. 4 is an example hardware-oriented representation of the signal processing unit 120 and the emissivity database 122 shown in FIG. 1. Continuing to refer to FIG. 4, system 400 includes one or more processors 410 operatively coupled to communication device 420, data storage device 430, one or more input devices 440, one or more output devices 450 and memory 460. Communication device 420 may facilitate communication with external devices, such as an equipment monitoring system (not shown) and/or a digital camera or cameras. Input device(s) 440 may include, for example, a keyboard, a keypad, a mouse or other pointing device, a microphone, knob or a switch, an infra-red (IR) port, a docking station, and/or a touch screen. Input device(s) 440 may be used, for example, to enter information into the system 400. Output device(s) 450 may include, for example, a display (e.g., a display screen) a speaker, and/or a printer.

Data storage device 430 may include any appropriate persistent storage device, including combinations of magnetic storage devices (e.g., magnetic tape, hard disk drives and flash memory), optical storage devices, Read Only Memory (ROM) devices, etc., while memory 460 may include Random Access Memory (RAM).

Data storage device 430 may store software programs that include program code executed by processor(s) 410 to cause system 400 to perform any one or more of the processes described herein. Embodiments are not limited to execution of these processes by a single apparatus. For example, the data storage device 430 may store a machine learning/object classification software program 432 that provides functionality corresponding to image processing steps referred to above in connection with FIG. 3.

Data storage device 430 may also store image manipulation software program 434, which may also play a role in the image processing referred to above in connection with FIG. 3. In addition, the data storage device 430 may store a temperature determination software program 436, which may control the processor(s) 410 to perform processing related to pyrometric aspects of the process of FIG. 3, as described above. Moreover, the data storage device 430 may store a temperature map synthesis software program 438, which may be involved in the functionality described above in connection with block 318 in FIG. 3. Continuing to refer to FIG. 4, data storage device 430 may store an emissivity database 439, which may correspond to the emissivity database 122 as discussed above. Data storage device 430 may store other data and other program code for providing additional functionality and/or which are necessary for operation of system 400, such as device drivers, operating system files, an interface or interface(s) to the digital camera(s), etc.

A technical effect is to provide improved temperature detection via pyrometric processing in conjunction with machine-learning-based object identification.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may include any number of hardware and/or software elements suitable to provide the functions described herein as well as any other functions. For example, any computing device used in an implementation of some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. A person of ordinary skill in the relevant art may recognize other embodiments may be practiced with modifications and alterations to that described above.

What is claimed is:

1. A method, comprising:
   capturing an image;
   performing region detection on the captured image, said region detection including identifying an object represented in the captured image;
   detecting emissivity of the identified object; and
   determining a temperature of the object based on the detected emissivity of the object;
   wherein said detecting step includes looking up emissivity data from an emissivity data store based on a result of identifying said object.

2. The method of claim 1, wherein the identifying of the object includes using a machine learning algorithm.

3. The method of claim 2, wherein the machine learning algorithm comprises R-CNN (region proposal with a convolutional neural network).

4. The method of claim 1, wherein:
   the identified object is a first object;
   the region detection includes identifying a second object represented in the captured image, the second object different from the first object;
   the method further comprising:
   detecting emissivity of the second object; and
   determining a temperature of the second object based on the detected emissivity of the second object;
   wherein the determined temperature of the second object is different from the determined temperature of the first object.

5. The method of claim 4, wherein the region detection includes identifying a third object represented in the captured image, the third object different from the first and second objects;
   the method further comprising:
   detecting emissivity of the third object; and
   determining a temperature of the third object based on the detected emissivity of the third object;
   wherein the determined temperature of the third object is different from the determined temperature of the second object and is also different from the determined temperature of the first object.

6. The method of claim 5, further comprising:
using results of the temperature of the first, second and third objects to synthesize a temperature map of the captured image; the first, second and third objects represented in the temperature map.

7. The method of claim 1, wherein the captured image is at least partially an infra-red image.

8. The method of claim 7, wherein the captured image is partially a visible light image.

9. The method of claim 1, wherein the captured image is a composite image formed from respective outputs of two digital cameras.

10. An optical temperature-detection apparatus, comprising:
a wavelength splitter;
a digital camera oriented to capture an image of an object through the wavelength splitter;
a signal processing unit in communication with the digital camera to receive image data from the digital camera; and
an emissivity data storage unit in communication with the signal processing unit to supply emissivity data to the signal processing unit.

11. The apparatus of claim 10, wherein the signal processing unit is configured to perform region detection with respect to the received image data, said region detection including identifying the object.

12. The apparatus of claim 11, wherein:
the object is a first object; and
said region detection includes identifying a second object represented by the image data.

13. The apparatus of claim 12, wherein the signal processing unit receives first emissivity data and second emissivity data from the emissivity data storage unit; the first emissivity data indicative of an emissivity of the first object; the second emissivity data indicative of an emissivity of the second object.

14. The apparatus of claim 13, wherein the signal processing unit is configured to determine a temperature of the first object based in part on the first emissivity data and to determine a temperature of the second object based in part on the second emissivity data.

15. The apparatus of claim 10, further comprising:
a timing unit coupled to the digital camera for controlling a timing at which the digital camera captures image data with respect to the object.

16. An optical temperature-detection apparatus, comprising:
a digital camera;
a processor coupled to the digital camera to receive image data from the digital camera; and
a memory in communication with the processor, the memory storing program instructions, the processor operative with the program instructions to perform functions as follows:
performing region detection on an image represented by the image data, said region detection including identifying an object represented in the image;
detecting emissivity of the identified object; and
determining a temperature of the object based on the detected emissivity of the object;
wherein said detecting function includes looking up emissivity data from an emissivity data store based on a result of identifying said object.

17. The apparatus of claim 16, wherein the identifying of the object includes using a machine learning algorithm.

18. The apparatus of claim 17 wherein said using the machine learning algorithm includes training the machine learning algorithm.

19. The apparatus of claim 17 wherein said using the machine learning algorithm includes operating the machine learning algorithm in an inference mode.

20. The apparatus of claim 17, wherein the machine learning algorithm comprises R-CNN (region proposal with a convolutional neural network).

21. The apparatus of claim 16, wherein:
the identified object is a first object;
the region detection includes identifying a second object represented in the image data;
the processor further operative with the program instructions to perform functions as follows:
detecting emissivity of the second object; and
determining a temperature of the second object based on the detected emissivity of the second object.

22. The apparatus of claim 21, wherein the region detection includes identifying a third object represented in the image data;
the processor further operative with the program instructions to perform functions as follows:
detecting emissivity of the third object; and
determining a temperature of the third object based on the detected emissivity of the third object.

* * * * *